(12) United States Patent
Herter

(10) Patent No.: US 6,504,319 B2
(45) Date of Patent: Jan. 7, 2003

(54) ELECTRODE-LESS DISCHARGE LAMP

(75) Inventor: Beate Herter, Karlsruhe (DE)

(73) Assignee: Heraeus Noblelight GmbH, Hanau (DE)

( * ) Notice: Subject to any disclaimer, the term of this patent is extended or adjusted under 35 U.S.C. 154(b) by 45 days.

(21) Appl. No.: 09/757,676

(22) Filed: Jan. 10, 2001

(65) Prior Publication Data
US 2002/0017876 A1 Feb. 14, 2002

(30) Foreign Application Priority Data
Mar. 10, 2000 (DE) ..................... 200 04 368 U

(51) Int. Cl.[7] ............................. H05B 41/16
(52) U.S. Cl. .................. 315/248; 315/326; 313/58; 313/485
(58) Field of Search ................. 315/248, 326, 315/267, 39, 58, 344; 313/110, 161, 612, 213, 485, 573

(56) References Cited

U.S. PATENT DOCUMENTS

| | | | | |
|---|---|---|---|---|
| 4,356,428 A | * | 10/1982 | Hanlet ....................... 313/485 |
| 4,884,007 A | * | 11/1989 | Lagushenko et al. ........ 313/573 |
| 5,325,018 A | * | 6/1994 | El-Hamamsy ............... 315/248 |
| 5,327,049 A | * | 7/1994 | Smolka et al. ............... 315/248 |
| 5,610,477 A | * | 3/1997 | Ivanov et al. ................ 313/573 |
| 5,814,951 A | | 9/1998 | Smolka et al. ............... 315/248 |
| 6,323,601 B1 | * | 11/2001 | Klein et al. .................. 315/248 |

FOREIGN PATENT DOCUMENTS

| | | |
|---|---|---|
| DE | 41 20 730 A1 | 1/1993 |
| DE | 195 47 813 C2 | 6/1997 |
| DE | 195 47 519 A1 | 7/1997 |
| GB | 1003873 | 9/1965 |

* cited by examiner

*Primary Examiner*—Don Wong
*Assistant Examiner*—Jimmy T. Vu
(74) *Attorney, Agent, or Firm*—Fulbright & Jaworski L.L.P.

(57) ABSTRACT

In a preferred embodiment of the discharge lamp an additional transparent body (21) is disposed along the optical axis (10) in a second end (16) of the bulb (2). In the area of the second end (16) outside of the lamp bulb (2) an additional radiation source (configured as a thermal radiator (22) is provided, whose radiation passes through the transparent body (21) into the bulb (2), both the radiation produced by the plasma and the radiation of the thermal radiator being carried out through the first transparent body (20) configured as a condenser lens.

14 Claims, 3 Drawing Sheets

ELECTRODE-LESS DISCHARGE LAMP

The invention relates to an electrode-less low-pressure discharge lamp with a hermetically sealed lamp bulb, wherein a plasma is formed by creating a high-frequency electromagnetic field in the bulb interior, and radiation produced by the plasma exits from the bulb along an established optical axis through at least one body transparent to UV radiation, in a first end of the bulb, at least one diaphragm or diaphragm body with a through-bore being provided along the optical axis (10).

The lamps referred to herein as electrode-less discharge lamps are those which have no actual electrodes inside of their envelope, and in which a plasma is formed by producing an electromagnetic field; the field can be produced for example, in a capacitive manner by electrodes applied to the lamp's envelope or bulb. It is also possible, however, to perform an inductive creation of the electromagnetic field.

DE-OS 41 20 730 discloses an electrode-less low-pressure discharge lamp in whose bulb a plasma is formed by producing a high-frequency electromagnetic field and light produced by the plasma issues from the bulb; in this case a diaphragm of a high-melting material is disposed in the area of the plasma and contains an opening for constricting the plasma area, the diaphragm having an optical axis through the opening, along which the light emerges. In order to achieve sufficiently high luminous fluxes and densities in the constriction of the high-frequency field, the materials must withstand severe wall stresses so that they do not degrade, melt, release impurities, much less shatter as a result of thermal shock when turned on and off.

According to DE-OS 41 20 730, boron nitride is preferred as the material for the diaphragm.

Furthermore, GB Patent 1,003,873 discloses an electrode-less high-frequency discharge spectral lamp which contains a sealed light bulb of transparent material, wherein the lamp bulb is divided into two parts which are joined together by a capillary tunnel, and wherein electromagnetic systems are provided for the production of a discharge within the metal vapor in the bulb. The injection of the electromagnetic energy for the discharge is sustained by a coil system surrounding the lamp bulb, the actual ignition being performed through external electrodes.

Great problems regarding ignition were encountered according to the British patent, so that additional electrodes had to be provided outside of the lamp bulb to initiate ignition; radiation directed along a preferred beam axis is not provided therein.

Furthermore, DE 195 47 519 A1 has disclosed an electrode-less low-pressure discharge lamp, especially a deuterium lamp, which has a cylindrically symmetrical diaphragm which contains a cavity at each of its ends; the two cavities are connected together by a bore which simultaneously serves as the diaphragm aperture for the purpose of constricting the plasma produced by creating a high-frequency electromagnetic field in the interior to increase the intensity of the light emitted. Both ends of the cylindrically symmetrical diaphragms are provided with a hermetic seal, at least one of which is configured as an exit window; in a preferred embodiment the creation of the electromagnetic field is accomplished capacitively by electrodes located on the end surfaces which have at least one opening for the emission of the radiation provided that they are adjacent to an exit window.

DE 195 47 813 C2 likewise discloses an electrode discharge lamp with diaphragm. In the discharge vessel a plasma is formed by producing a high-frequency electromagnetic field and through it the light produced by the plasma issues from the discharge vessel through an area of the discharge vessel that is transparent at least to UV light, at least one diaphragm of high-melting material being arranged in the area of the plasma and having at least one opening for the constriction of the plasma area. In the plasma area at least two diaphragm apertures are provided on an optical axis along which the light issues, the discharge vessel being provided along the beam axis at each of its ends with a broad electrode for the capacitive production of the electromagnetic field; at the same time at least one of the electrodes contains an opening in the area of the axis of the beam exit, which is arranged adjacent to an exit window permeable to ultraviolet light.

The known discharge lamps have proven problematical in regard to complete UV/vis light sources for analytic purposes, wherein a lamp unit has a deuterium lamp and a tungsten lamp in a shine-through arrangement which together with a shutter contains an SMA optical waveguide terminal and an input apparatus for both lamps on a printed circuit board. In systems with additional condenser lenses, transmission losses occur upon exit from a window transparent to ultraviolet and upon passing through the condenser lens.

The invention is addressed to the problem of offering a very simple and hand-held light source which has low transmission losses and is suitable for board construction in a miniature size. Furthermore, it must be possible in a comparatively simple manner to inject the light into a light-conducting fiber.

The problem is solved by the fact that the transparent body is formed as a lens in the first end of the lamp bulb.

It proves to be advantageous that the transmission of the ultraviolet light is considerably improved; thus one material penetration is eliminated, since instead of the former penetration of the radiation through window and lens only a single penetration of the radiation through lens material is necessary. The result is not only simplified construction but also an improved yield of light.

Advantageous embodiments of the invention according to claim 1 are given in claims 2 to 13.

In one preferred embodiment, at least one lens is made as a body transparent to ultraviolet radiation. Along the optical axis an additional transparent body is disposed in the area of a second end of the bulb, the transparent bodies forming at their bulb ends a hermetically tight junction in their marginal area.

For the capacitive generation of the electromagnetic field, the lamp bulb is provided along its axis with a broad electrode at each of its ends, each of the electrodes containing an opening in the area of the axis of the beam's exit which is disposed adjacent to the exit.

In a preferred embodiment, an additional radiation source in the form of a thermal radiator is disposed along the optical axis in the area of the second end outside of the lamp bulb, whose radiation enters the bulb through the transparent body of the second end, both the radiation produced by the plasma and the radiation of the thermal radiator being carried out through the transparent body of the first end.

The thermal radiator is arranged along the beam axis, the radiation of the thermal radiator being guided by the diaphragm aperture at the beam exit; this means that both the radiation produced by the plasma and the radiation of the thermal radiator are guided by the first transparent body configured as an ultraviolet-permeable lens.

The diaphragm aperture of the beam exit is of circular configuration, its diameter ranging from 0.1 to 6 mm; the diaphragm consists preferably of aluminum oxide, aluminum nitride, or boron nitride; it can also consist, however, of thorium oxide, beryllium oxide, polycrystalline diamond or a high-melting metal such as molybdenum or tungsten.

The ultraviolet-permeable lens and the window of the beam inlet consist preferably of quartz glass, glass transparent to ultraviolet, or sapphire.

Preferably deuterium is used to fill the lamp bulb with a cold fill pressure of 1 to 100 mbar. The electrodes are connected to a high-frequency generator which produces an excitation frequency ranging from 0.1 KHz to 2450 MHz.

Furthermore, savings of material and manufacturing costs are advantageously obtained due to the fact that now an exit window serving also as a condenser lens is used, and also the calibration operation for a proper mounting and positioning of the lens at a certain distance from the lamp is eliminated.

Another advantage is to be seen is the coverage of a wider angle by the emitted light since the lens is brought closer to the radiating plasma spheres in the area of the diaphragm. This too results in an elevated light yield.

Furthermore, the space formerly between the discharge lamp and condenser lens can now be used for a greater volume of gas in the discharge lamp, so that a longer useful life of the discharge lamp can be achieved, requiring the same amount of space.

The subject matter of the invention will now be further explained with the aid of FIGS. 1 to 4.

Figure 4:
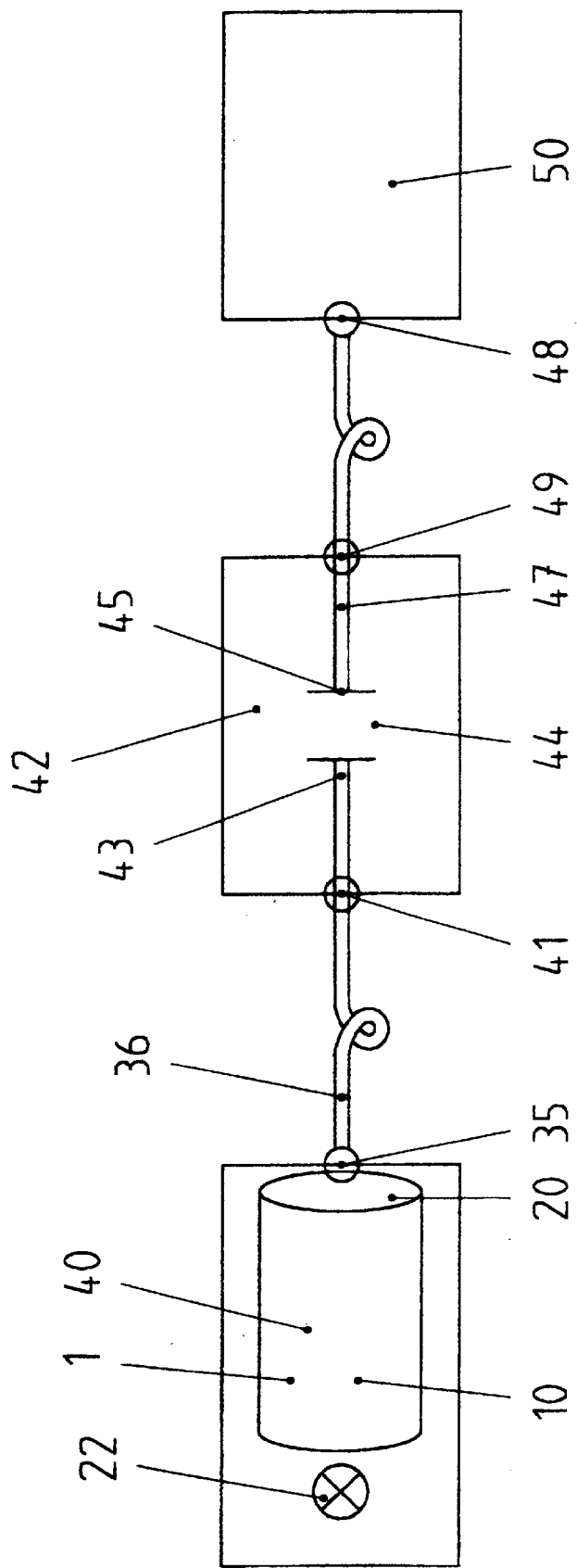

In FIG. 4 the use of a radiation system with a low-pressure discharge lamp and a thermal radiator for spectrographic measurements is represented schematically by means of a block diagram.

Figure 1:
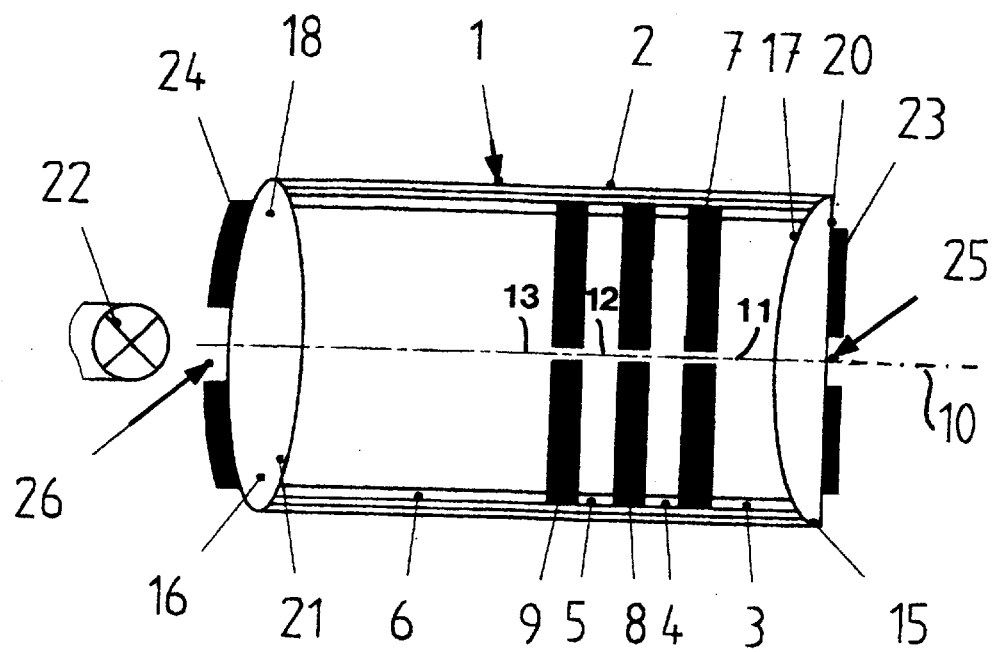
FIG. 1 shows schematically a longitudinal section through the discharge lamp according to the invention; together with a thermal radiator shown partially cut away.

FIG. 1 shows the discharge lamp 1 in longitudinal section with a cylindrically symmetrical lamp bulb 2 and spacer rings 3,4, 5 and 6 situated therein, diaphragms 7, 8 and 9 being disposed between spacer rings 3 and 4, 4 and 5 and 5 and 6, and having diaphragm apertures 11, 12 and 13 running along an optical axis 10. The lamp bulb 2 is provided at each end 15, 16 with corresponding openings 17, 18, each being hermetically sealed by a first and second transparent body 20, 21. Through the opening 17 and the body 20 transparent to ultraviolet radiation, radiation is emitted outwardly from the interior of the bulb 2 along the optical axis 10. A second opening 18 serves for the admission of radiation into the bulb 2 from without along the optical axis 10, such radiation being produced by a thermal radiator 22 here represented symbolically, such as the one seen, for example, in FIG. 2 of DE 195 47 519 A1; the first opening 17 is thus provided for the emission of the radiation produced in the interior of the lamp 1 and of the radiation generated externally in the lamp bulb 2. The outlet opening 17 has as the transparent body 20 a condenser lens transparent to ultraviolet radiation, the interior of the lamp bulb 2 being hermetically sealed from the external environment by the condenser lens 20 in the front end 15 and by the transparent body 21 in the second end 16.

The production of the electromagnetic field is performed in a capacitive manner by broad-surface electrodes 23, 24, which are applied along the optical axis 10 to the ends 15, 16, of the lamp bulb 2; electrode 24 has an aperture 26 smaller than the bulb opening 18 for the admission of the radiation emitted by the thermal radiator 22, while the electrode 23 on end 15 has an aperture 25 smaller than the bulb opening 17 for the output of the ultraviolet radiation and the radiation produced by the thermal radiator.

Figure 2:
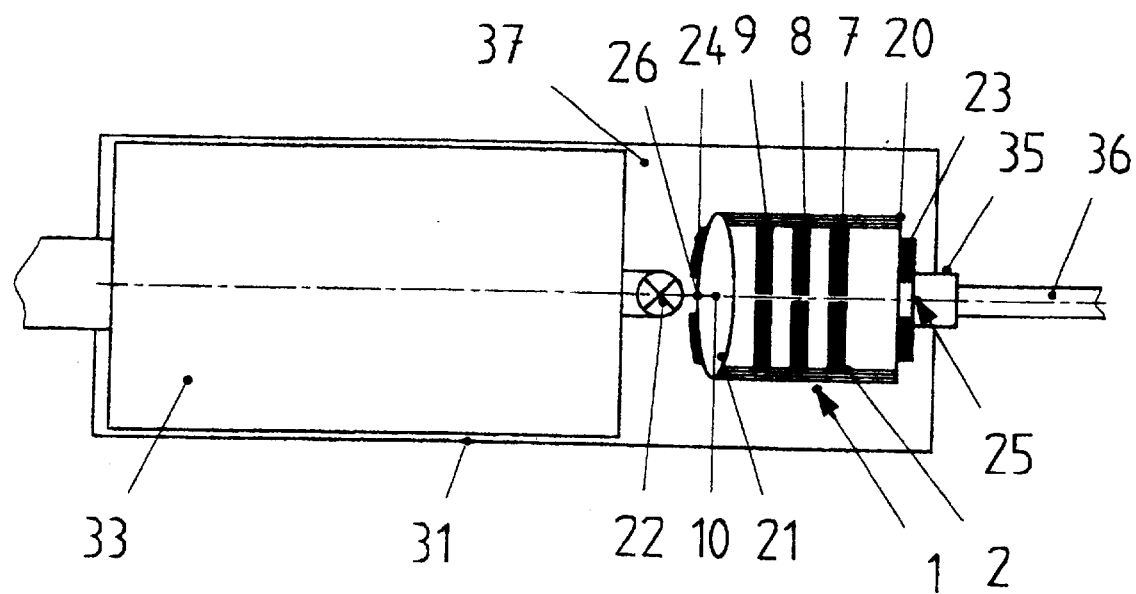
FIG. 2 shows schematically an arrangement of the discharge lamp on a circuit board in an apparatus for manual spectroscopy.

In FIG. 2 can be seen an UV-VIS light source module 31 for the emission of ultraviolet radiation and visible light, which has a discharge lamp 1 for ultraviolet radiation, a thermal radiator 22 and an electrical input apparatus 33 for controlling discharge lamp 1 andthe thermal radiator; the light-source module 31 is mounted on a small, hand-held circuit board 37 and takes but comparatively little electric power, so that the module 31 can be operated by means of a dry cell or storage battery independently of the fixed power mains; in FIG. 2 it can be seen that the thermal radiator 22—in the form of a miniature incandescent bulb or halogen bulb—is provided on the end of the discharge lamp 1 facing the input apparatus 33, along the optical axis 10, the aperture 26 in electrode 24 being provided at the second end of the discharge lamp 1 for the entry of the radiation emitted by the thermal radiator 22 into the interior of the lamp bulb 2. The operation of the lamp is accomplished through the input apparatus 33 which supplies current both to the discharge lamp 1 and to the miniature halogen lamp as thermal radiator 22. In the area of the aperture 25 of electrode 23 of the discharge lamp 1 there is an outwardly leading optical waveguide connector 35 which is associated directly with the transparent body 20 as lens. An optical waveguide 36 is connected to the optical waveguide connector 35, and is suitable especially for phase-coupled UV-VIS spectrometer systems for water analysis, diagnostics and environmental applications.

The light source module 31 is thus situated on a circuit board 37 which bears the complete lamp unit consisting of discharge lamp 1, thermal radiator 22, a controllable closure (shutter), application lens with an SMA light-switch connection and input circuit 33 for the operation of both lamps.

It proves to be especially advantageous that the two lamps by themselves and the shutter can be operated separately from one another.

Figure 3:
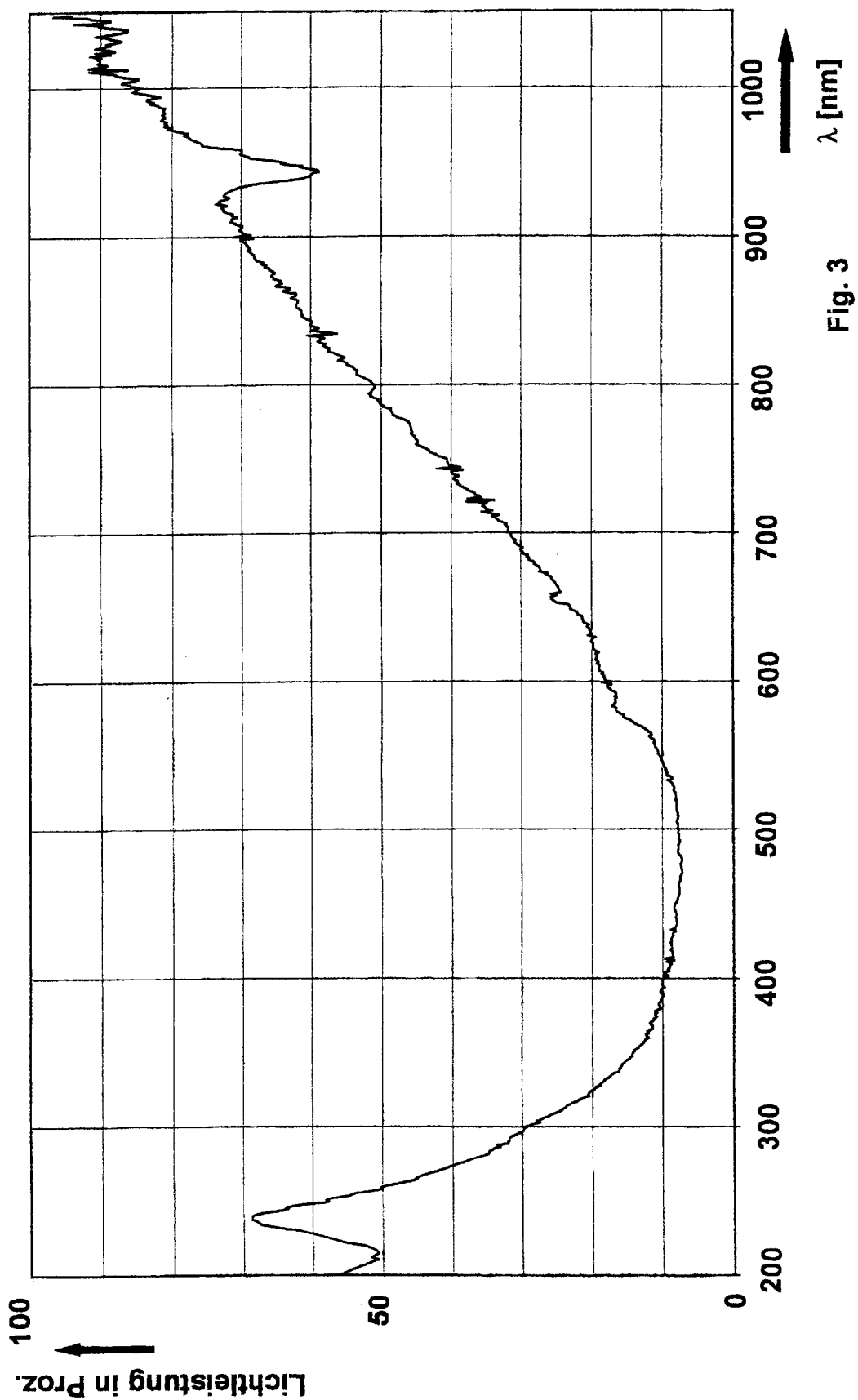
FIG. 3 is a diagram of the light output in percent as a function of wavelength.

In FIG. 3 the spectrum of the radiation issuing from the light source module 31 (FIG. 2) is represented, the wavelength λ being given in nanometers, while the light output is given in relative units from 0 to 100% (percent).

According to the left part of the graph a spectrum in the range from 200 to 400 nm is produced by a deuterium lamp as the discharge lamp, while the spectrum of the halogen-tungsten lamp serving as the thermal radiator extends over the range from 300 to 1100 nm. Thus a spectral range of 200 to 1100 nm is formed for analysis purposes, the spectrum of the light source being determined through optical waveguides by means of a detector.

It proves to be especially advantageous that a discharge lamp in the form of a deuterium lamp produces a continuum in the short-wave ultraviolet range, so that the discharge lamp operating in conjunction with the incandescent lamp (halogen lamp) in the form of a thermal radiator can serve as an appropriate aid in the analysis of various substances such as gases or liquids, the actual analysis being performed by a particular sensor, as is explained below in conjunction with FIG. 4.

Fundamentally, the sensor is joined to the optical waveguide and a capillary, and forms an analysis unit together with the light source.

Thus the spectral range that can be used for analysis purposes ranges from 200 to about 1050 nanometers, which corresponds to a spectrum from the UV-C range to the near infrared range; in FIG. 3 the radiation visible to the eye is shown with a range between 400 and 700 nanometers.

According to FIG. 4, a radiation system 40 serving for excitation has a discharge lamp 1 as well as a thermal radiator 22, which (as in FIG. 2) are arranged along an optical axis 10, the optical axis intersecting the schematically represented transparent body 20 configured as a condenser lens. Also situated on the optical axis 10 is the optical waveguide connection 35, which serves for connecting an optical waveguide 36. The optical waveguide 36 passes through entrance 41 into a cell 42 containing a specimen, radiation issuing from the tip 43 of the optical waveguide 36 entering the specimen 44 and exiting the cell 42 along an optical axis through the tip 45 of a following optical waveguide 47; in actual practice, in the case of the analysis of potable water or non-turbid waste water, a distance of, for example, 10 mm between the tips is used. The unabsorbed radiation is carried through optical waveguide 47 and output 49 to the input of an analyzer 50, and the latter provides an analysis of the specimen material situated in the cell 42 by means of the absorbed spectrum.

An important advantage of the use of optical waveguides to and from cell 42 is to be seen in the fact that there are no problems in subjecting even fluids and even aggressive substances to absorption measurement without danger to any sensitive electrical or electronic optical components of the radiation system 40 or of the analyzer 50.

What is claimed is:

1. An electrode-less low-pressure discharge lamp comprising a hermetically sealed lamp bulb in which a plasma is formed by producing a high-frequency electromagnetic field in the interior of the bulb, and radiation produced by the plasma exits the bulb along a given optical axis through at least one body transparent to ultraviolet radiation in a first end of the bulb, at least one diaphragm with a through bore along the optical axis being provided in the area of the plasma, wherein the transparent body is formed as a lens in the first end of the bulb.

2. The discharge lamp according to claim 1, wherein the transparent body is configured as a condenser lens.

3. The discharge lamp according to claim 1, wherein an additional transparent body is disposed along the optical axis in a second end of the bulb.

4. The discharge lamp according to claim 1, wherein at least one of the transparent bodies forms a hermetically sealed junction in its marginal area with one of the ends of the bulb.

5. The discharge lamp according to claim 1, wherein the bulb is provided along the optical axis with an electrode in the area of each of its ends for the capacitive generation of the electromagnetic field, each of the electrodes containing an aperture in the area of the axis of the transparent body.

6. The discharge lamp according to claim 1, wherein an additional radiation source configured as a thermal radiator is arranged along the optical axis in the area of the second end outside of the lamp bulb, whose radiation enters the bulb through the transparent body, both the radiation produced by the plasma and the radiation of the thermal radiator being carried out through the first transparent body.

7. The discharge lamp according to claim 1, wherein at least one aperture of the diaphragms is of circular configuration and has a diameter of from 0.2 to 6 mm.

8. The discharge lamp according to claim 1, wherein said at least one diaphragm comprises a member selected from the group consisting of aluminum oxide, aluminum nitride, and boron nitride.

9. The discharge lamp according to claim 1, wherein at least one diaphragm comprises a member selected from the group consisting of thorium oxide, beryllium oxide and polycrystalline diamond.

10. The discharge lamp according to claim 1, wherein at least one diaphragm consists of high-melting metal.

11. The discharge lamp of claim 10, wherein the high-melting metal is selected from the group consisting of molybdenum and tungsten.

12. The discharge lamp according to claim 1, wherein the transparent body comprises a member selected from the group consisting of quartz glass, UV-transparent glass, and sapphire.

13. The discharge lamp according to claim 1, wherein the lamp bulb is filled with deuterium with a cold fill pressure of 1 to 100 mbar.

14. The discharge lamp according to claim 1, wherein the electrodes are connected to a high-frequency generator which produces an excitation frequency in the range from 0.1 KHz to 2450 MHZ.

* * * * *